(12) United States Patent
Lum

(10) Patent No.: US 7,680,904 B2
(45) Date of Patent: Mar. 16, 2010

(54) DIAGNOSTIC METHOD AND APPARATUS FOR DETECTING AND LOCATING COMPUTER NETWORK DISCONTINUITIES

(75) Inventor: Jackson Lum, Roslyn, NY (US)

(73) Assignee: Logic Controls, Inc., New Hyde Park, NY (US)

( * ) Notice: Subject to any disclaimer, the term of this patent is extended or adjusted under 35 U.S.C. 154(b) by 1595 days.

(21) Appl. No.: 10/913,194

(22) Filed: Aug. 6, 2004

(65) Prior Publication Data

US 2006/0029034 A1 Feb. 9, 2006

(51) Int. Cl.
*G06F 15/177* (2006.01)
*G06F 11/00* (2006.01)

(52) U.S. Cl. .............................. 709/220; 714/2; 714/4; 714/13; 714/25

(58) Field of Classification Search .................. 709/220
See application file for complete search history.

(56) References Cited

U.S. PATENT DOCUMENTS

| | | | |
|---|---|---|---|
| 4,490,785 A | 12/1984 | Strecker et al. | |
| 5,295,139 A | 3/1994 | Palmer | |
| 5,541,759 A * | 7/1996 | Neff et al. | .................. 398/139 |
| 6,032,194 A | 2/2000 | Gai et al. | |
| 6,195,760 B1 | 2/2001 | Chung et al. | |
| 6,253,334 B1 | 6/2001 | Amdahl et al. | |
| 6,266,781 B1 | 7/2001 | Chung et al. | |
| 6,292,905 B1 * | 9/2001 | Wallach et al. | .................. 714/4 |
| 6,388,995 B1 | 5/2002 | Gai et al. | |
| 6,535,491 B2 | 3/2003 | Gai et al. | |
| 6,581,166 B1 | 6/2003 | Hirst et al. | |

* cited by examiner

*Primary Examiner*—Patrice Winder
*Assistant Examiner*—Xiang Yu
(74) *Attorney, Agent, or Firm*—Hoffmann & Baron, LLP

(57) ABSTRACT

A computer network, method, and control unit provide two transmitters and two receivers connected to a server and workstations. The workstations are serially connected by transmit and receive paths. The transmitters are connected to opposing ends of the transmit path and the receivers are connected to opposing ends of the receive path. The first transmitter and receiver are enabled and the second transmitter and receiver are disabled during a first phase of a breakage diagnostic mode. The first transmitter transmits a first test sequence and the first receiver receives first acknowledgement sequences. The first transmitter and receiver are disabled and the second transmitter and receiver are enabled during a second phase. The second transmitter transmits a second test sequence and the second receiver receives a quantity of second acknowledgement sequences, which is compared to the quantity of first acknowledgement sequences to determine whether there is a discontinuity in the network.

17 Claims, 8 Drawing Sheets

DIAGNOSTIC METHOD AND APPARATUS FOR DETECTING AND LOCATING COMPUTER NETWORK DISCONTINUITIES

BACKGROUND OF THE INVENTION

1. Field of the Invention

The present invention relates generally to computer networks and more specifically relates to a method and apparatus for determining the location of discontinuities in computer network connections.

2. Description of the Related Art

Reliability is paramount in computer networking systems. A primary source of network failure is cable breakage or faulty contacts associated with connectors. FIG. 1 shows a conventional computer networking system, in which a server 10 communicates through a control unit 12 to each of a plurality of workstations 18A-18E. The control unit 12 includes a transmitter 12 and a receiver 14.

Data is transmitted from the server 10 to the transmitter 12 in the control unit 16, which outputs the data on a transmit path 20. The transmit path 20 serially connects each of the plurality of workstations 18A-18E in a daisy chain configuration. Likewise, data is transmitted from one or more of the plurality of workstations 18A-18E on a receive path 22, which serially connects each of the plurality of workstations 18A-18E in a daisy chain configuration to the receiver 14. The receiver 14 then outputs the received data to the server 10.

If there is a break in the transmit path 20 at, for instance, point A, those workstations 18C-18E beyond the break will not receive information from the transmitter 12. Likewise, if there is a break in the receive path at, for instance, point B, those workstations 18A and 18B beyond the break, including the server 10, will not receive information from workstations 18C-18E.

FIG. 2 shows an attempt to solve the problem of finding a break in the network connection. In this solution, the transmit path 24 is coupled to an auxiliary transmit path 28 to form a closed transmit loop. Similarly, a receive path 26 is coupled to an auxiliary receive path 30 to form a closed receive loop. If there are no breaks in the connections, each of the workstations 18A-18E receives information transmitted from the control unit 14 twice—once from the transmit path 24 and once from the auxiliary transmit path 28. Likewise, information is received from both the receive path 26 and the auxiliary receive path 30. However, since both the transmit and receive paths are closed loops, there is a substantial risk of signal collisions, which result in distortion and communication errors.

Accordingly, it is a goal of the system and method in accordance with the present invention to quickly and accurately detect and locate breaks in network connections. It is another goal of the present invention to provide a system and method that will not distort information on the network that may lead to communication errors. It is a further goal of the present invention to provide uninterrupted access to all workstations even when there is a break in the network connections.

SUMMARY OF THE INVENTION

The foregoing goals are satisfied in accordance with the present invention, which, in one embodiment, provides a computer network system and control unit that include a first transmitter, first receiver, second transmitter, and second receiver connected to a server and a plurality of workstations. The workstations are serially connected by a transmit path and a receive path. The first transmitter is connected to one end of the transmit path and the second transmitter is connected to the other end of the transmit path. The first receiver is connected to one end of the receive path and the second receiver is connected to the other end of the receive path.

The first transmitter and the first receiver are enabled, and the second transmitter and the second receiver are disabled during a first phase of a breakage diagnostic mode. The first transmitter transmits a first test sequence, the workstations transmit a first acknowledgement sequence in response to receiving the first test sequence, and the first receiver receives a quantity of first acknowledgement sequences.

The first transmitter and the first receiver are disabled, and the second transmitter and the second receiver are enabled during a second phase of the breakage diagnostic mode. The second transmitter transmits a second test sequence and the workstations transmit a second acknowledgement sequence in response to receiving the second test sequence. The second receiver receives a quantity of second acknowledgement sequence, which is compared to the quantity of first acknowledgement sequences to determine whether a discontinuity in the computer network has occurred.

Another embodiment of the present invention provides a method of detecting discontinuities in a computer network system, which include the steps of enabling the first transmitter and first receiver, and disabling the second transmitter and second receiver during the first phase of the breakage diagnostic mode, transmitting a first test sequence by the first transmitter, transmitting a first acknowledgement sequence in response to receiving the first test sequence, and receiving a quantity of first acknowledgement sequences by the first receiver.

The method also includes disabling the first transmitter and first receiver, and enabling the second transmitter and second receiver during the second phase of the breakage diagnostic mode, transmitting a second test sequence by the second transmitter, transmitting a second acknowledgement sequence in response to receiving the second test sequence, and receiving a quantity of second acknowledgement sequences by the second receiver. The method then compares the quantity of first acknowledgement sequences with the quantity of second acknowledgement sequences, and detects a discontinuity in the computer network in response to these quantities being unequal.

These and other purposes, goals, and advantages of the present invention will become apparent from the following detailed description of illustrative embodiments thereof, which is to be read in connection with the accompanying drawings.

DETAILED DESCRIPTION OF THE PREFERRED EMBODIMENTS

Figure 1:
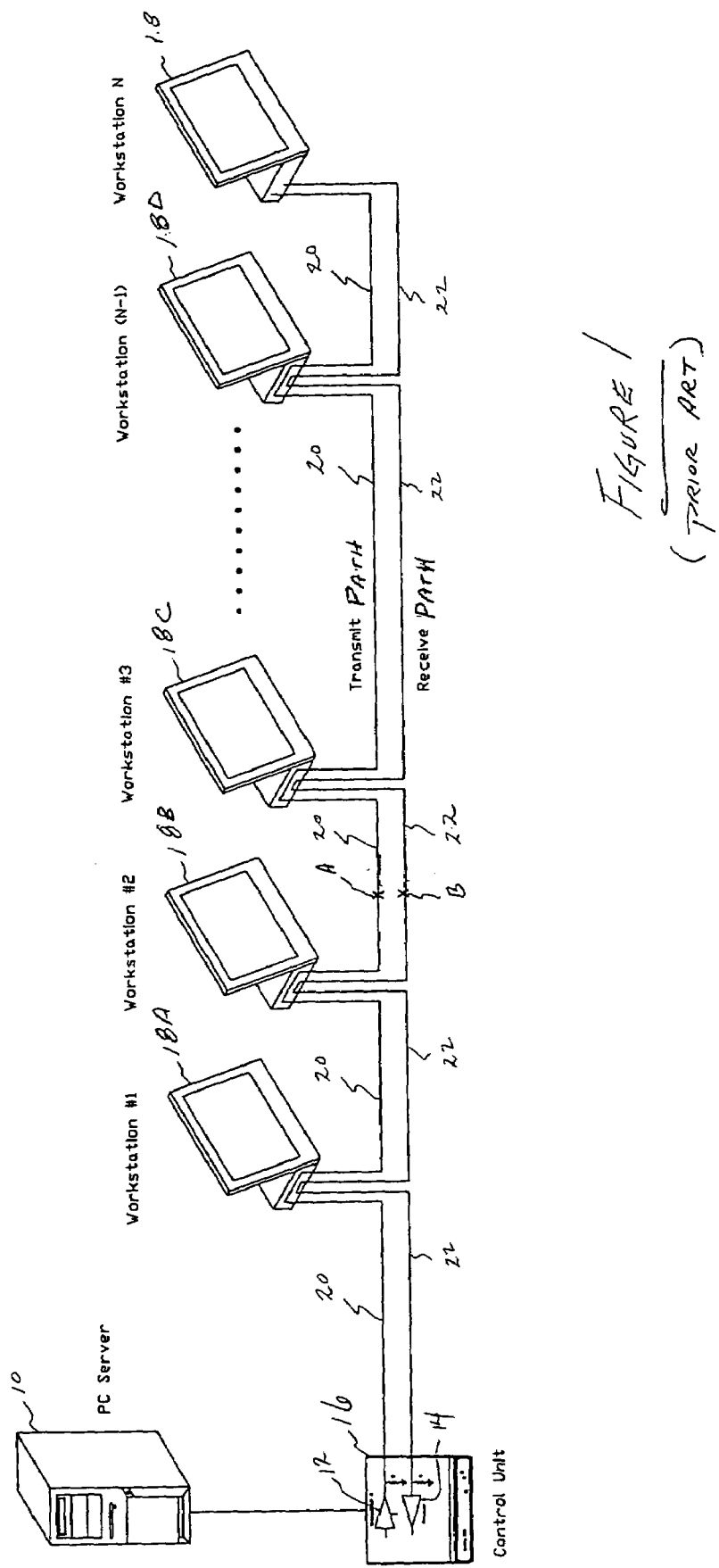
FIG. 1 is a block diagram of a conventional computer network system.
Figure 2:
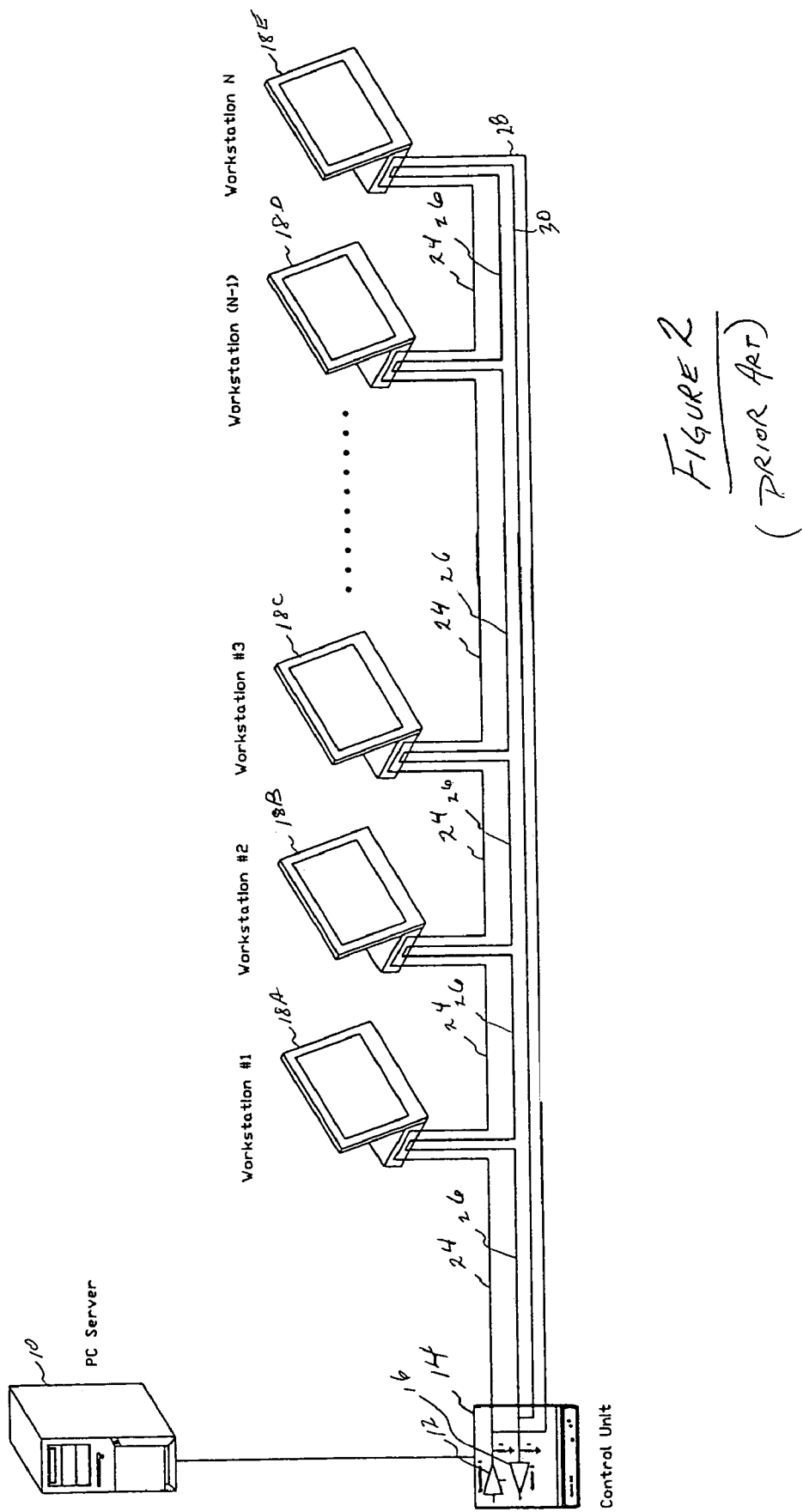
FIG. 2 is a block diagram of a computer network system incorporating a conventional solution to detecting a discontinuity in computer network connections.
Figure 3:
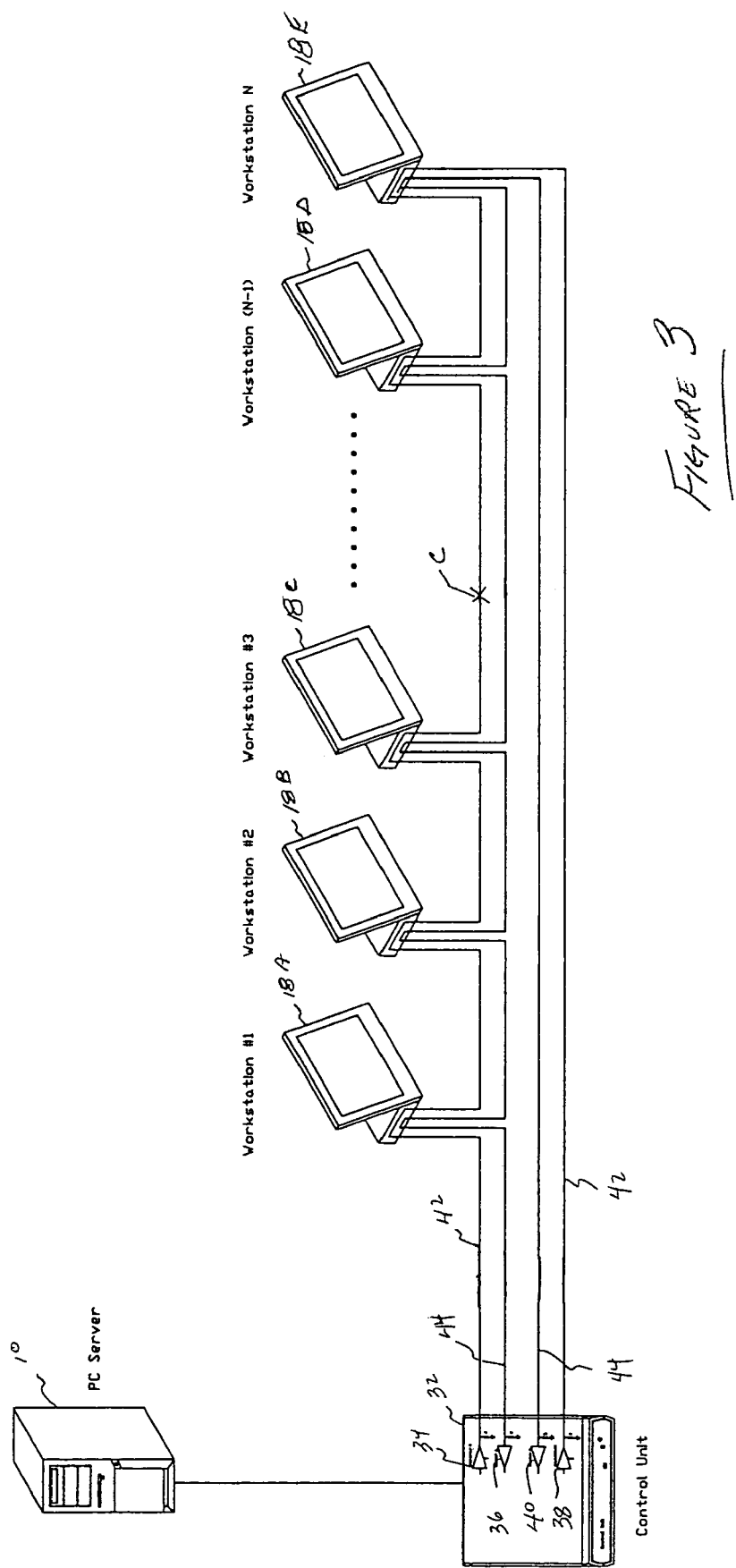
FIG. 3 is a block diagram of a computer network system that incorporates the detection of a discontinuity in computer network connections formed in accordance with the present invention.

FIG. 3 is a block diagram of a preferred embodiment of the computer network system formed in accordance with the present invention. The computer network system is configured to accurately detect and provide the location of a discontinuity or break in computer network connections.

A control unit 32 preferably includes a first transmitter 34, a first receiver 36, a second transmitter 38, and a second receiver 40. A transmit path 42 serially links each of the plurality of workstations 18A-18E in a daisy-chain configuration. The first transmitter 34 is preferably coupled to a first end of the transmit path 42 and a second transmitter 38 is preferably coupled to a second end of the transmit path 42.

Likewise, each of the plurality of workstations 18A-18E is linked by a receive path 44 in a serial daisy-chain configuration. The first receiver 36 is preferably coupled to a first end of the receive path 44 and the second receiver 40 is preferably coupled to a second end of the receive path 44.

During normal operation of the system in a normal mode, only the first transmitter 34 and the first receiver 36 are preferably enabled. The second transmitter 38 and the second receiver 40 are preferably disabled and terminated by an impedance equivalent to the network cable characteristic impedance Z during the normal mode. This substantially eliminates signal reflection.

Thus, a typical transmit process would involve transmission of data from the server 10 to the first transmitter 34 in the control unit 32. The first transmitter 34 would then preferably output the information to each of the plurality of workstations 18A-18E on the transmit path 42. Similarly, during normal mode if any of the workstations 18A-18E transmit information on the receive path 44, the information would be received by the first receiver 36 in the control unit 32 and transmitted to the server 10.

During a breakage diagnostic mode, the first transmitter 34 and the first receiver 36 are alternately enabled with the second transmitter 38 and the second receiver 40. For instance, during a first phase of the breakage diagnostic mode, the first transmitter 34 preferably transmits a first test sequence on the transmit path 42. This test sequence is then received by one or more of the workstations 18A-18E, each of which should transmit a first acknowledgement sequence on the receive path 44 to the first receiver 36.

If there are no breaks in either the transmit path 42 or the receive path 44, a first acknowledgement sequence is received from each of the plurality of workstations 18A-18E. However, if, for instance, there is a break C in the transmit path 42, only those workstations 18A-18C on the control unit side of the break C will respond with the first acknowledgment sequence.

In a second phase of the breakage diagnostic mode, the first transmitter 34 and the first receiver 36 are preferably disabled and the second transmitter 38 and the second receiver 40 are preferably enabled. A second test sequence is then preferably transmitted by the second transmitter 38, which may be received by one or more of the workstations 18A-18E. In response to receiving the second test sequence, each of the plurality of workstations 18A-18E preferably responds with a second acknowledgement sequence on the receive path 44 to the second receiver 40.

If there are no breaks in either the transmit path 42 or receive path 44, the second acknowledgement sequence will be received from each of the plurality of workstations 18A-18E by the second receiver 40. However, if there is for instance, a break C in the transmit path 42, then the second acknowledgment sequence is only received from those workstations 18D and 18E on the side of the break C opposite to that of the control unit 32.

Thus, if all network connections are sound, the number of acknowledgment sequences received by the first receiver 36 during the first phase of the breakage diagnostic mode should be the same as the number of acknowledgement sequences received by the second receiver 40 during the second phase of the breakage diagnostic mode. However, when there is a break in the network connections, an asymmetrical acknowledgement sequence profile is generated. That is, the first receiver 36 will only receive acknowledgement sequences from those workstations on the side of the break nearest the first receiver 36, whereas the second receiver 40 will only receive acknowledgement sequences from those workstations on the side of the break nearest the second receiver 40.

The computer network system formed in accordance with the present invention effectively eliminates signal distortion problems caused by conventional solutions to locating breaks in network connections by terminating the disabled transmitter/receiver pair in the network cable characteristic impedance Z when not in use. This absorbs substantially all signal energy and prevents distortion caused by signal reflections.

The asymmetrical acknowledgement sequence profile is preferably used to generate diagnostic messages that indicate the location of breaks in the network. The user is preferably notified of breaks by, for instance messages displayed on a computer monitor or by visual indicators, such as light emitting diodes (LED), on the control unit 32. This alerts network administrators to fix single breaks and avoid potential additional breaks before they occur. The diagnostic message may also be provided as an audible, tactile, or alternate type of sensory alarm.

In addition to detecting and providing the location of breaks in network connections, the network is preferably maintained in the breakage diagnostic mode to provide uninterrupted access to and from all workstations until the break can be fixed. Specifically, all accesses to the workstations 18A-18E are preferably performed twice. Each access is first performed when the first transmitter 34 and the first receiver 36 are enabled and the second transmitter 38 and the second receiver 40 are disabled. The same access is then repeated when the first transmitter 34 and the first receiver 36 are disabled and the second transmitter 38 and the second receiver 40 are enabled. This ensures access to workstations on both sides of the discontinuity.

Figure 4:
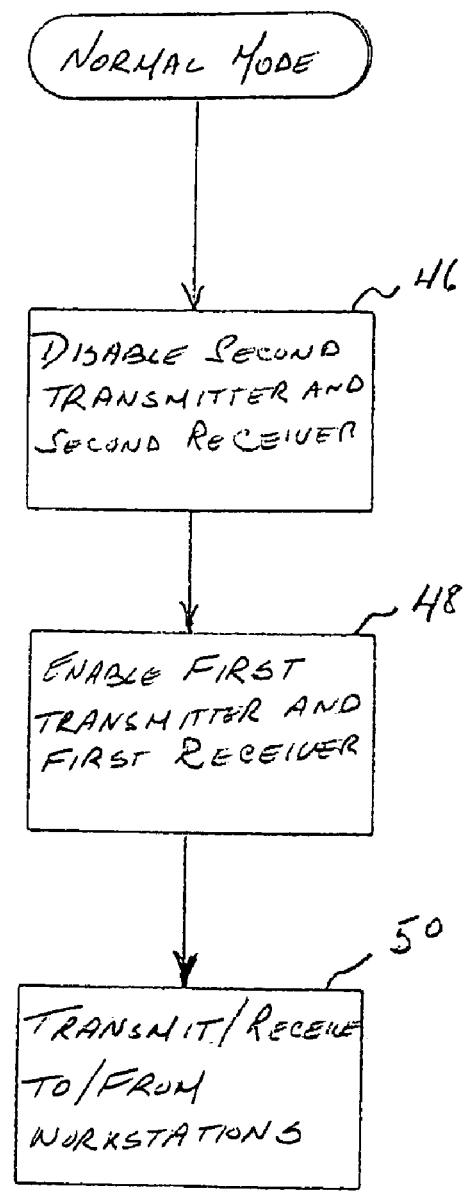
FIG. 4 is a flowchart of a normal mode in accordance with the present invention.

FIG. 4 is a flowchart of the normal mode in accordance with the present invention. The second transmitter and the second receiver are preferably disabled in step 46 and the first transmitter and the first receiver are preferably enabled in step 48. Normal access to and from the workstations is then performed in step 50.

Figure 5A:
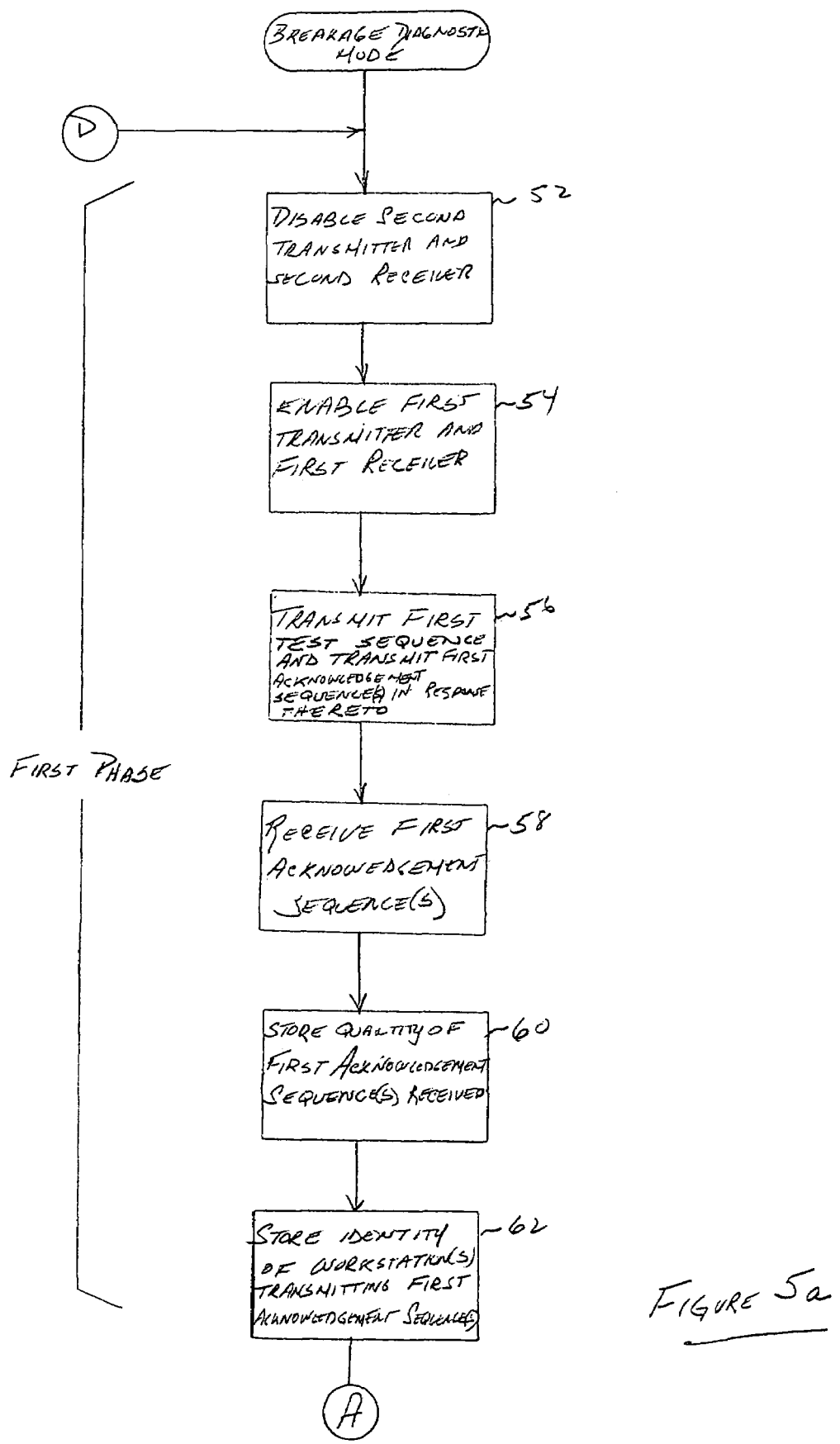
FIGS. 5a-5d are flowcharts of a breakage diagnostic mode in accordance with the present invention.

FIGS. 5a-5d are flowcharts for the breakage diagnostic mode in accordance with the present invention. As shown in FIG. 5a, during the first phase of this mode, the second transmitter and the second receiver are preferably disabled in step 52 and the first transmitter and the first receiver are enabled in step 54. A first test sequence is then preferably transmitted and a first acknowledgement sequence is transmitted by those workstations receiving the first test sequences in step 56. The first acknowledgement sequences are received in step 58. The quantity of first acknowledgement sequences is preferably stored in step 60 and the identity of those workstations responding with the first acknowledgement sequence is stored in step 62.

Figure 5B:
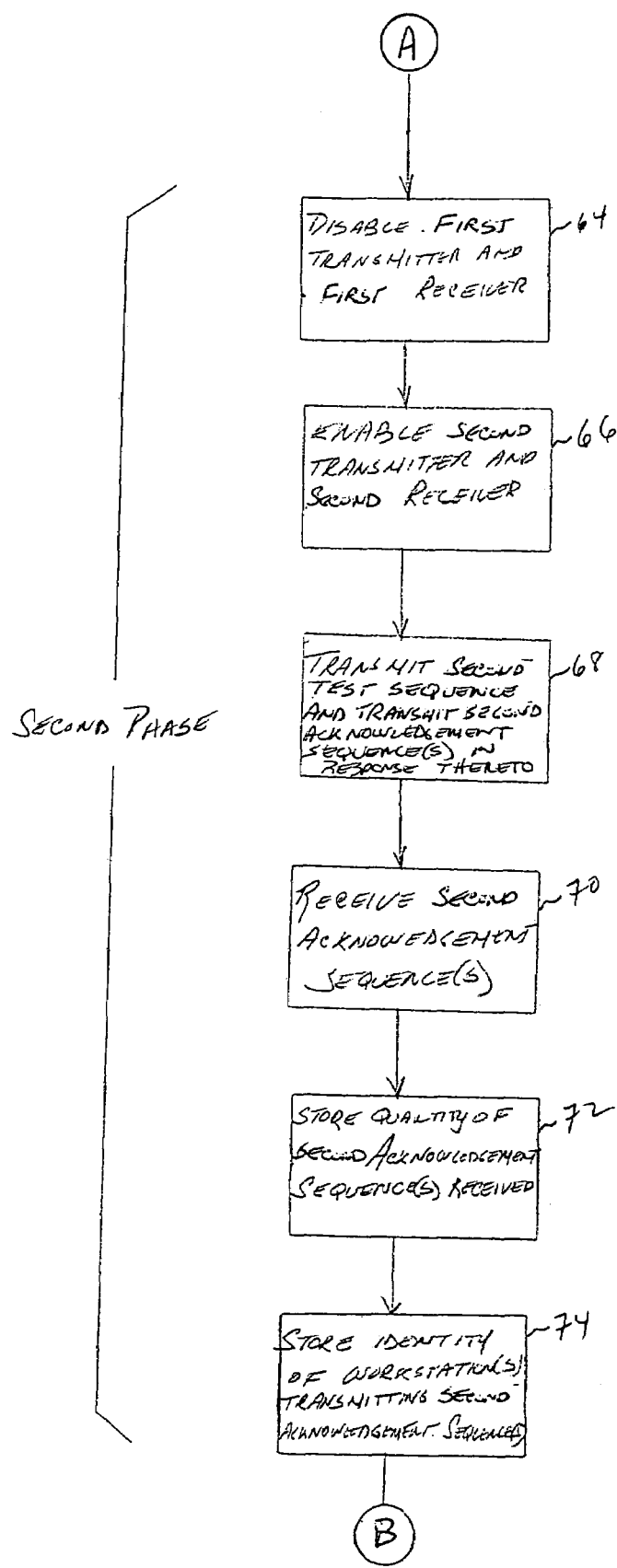

During the second phase of the breakage diagnostic mode shown in FIG. 5b, the first transmitter and the first receiver are preferably disabled in step 64 and the second transmitter and the second receiver are enabled in step 66. A second test sequence is then preferably transmitted and a second acknowledgement sequence is transmitted by those workstations receiving the second test sequence in step 68. A quantity of first acknowledgement sequences is received in step 70. The quantity of first acknowledgement sequences is preferably stored in step 72 and the identity of those workstations responding with the first acknowledgement sequences is stored in step 74.

Figure 5C:
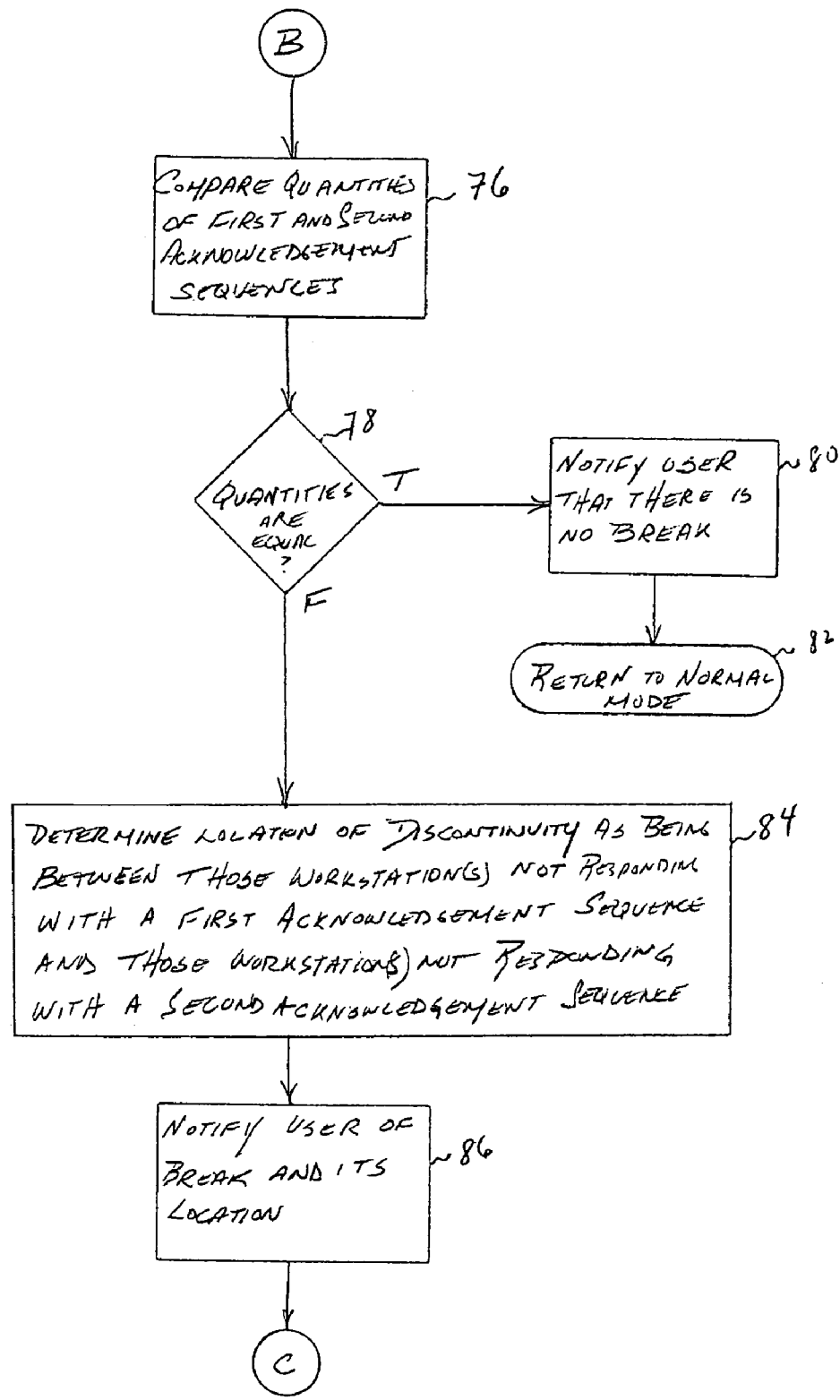

As shown in FIG. 5c, the quantity of first acknowledgement sequences and the quantity of second acknowledgement sequences are preferably compared in step 76. If the quantities are equal in step 78, the user is notified that there is no break in the network connections in step 80 and the process preferably returns to the normal mode in step 82.

If the quantities are not equal in step 78, the location of the break or discontinuity is preferably determined in step 84 as being between those workstations that have only responded with the first acknowledgement sequence and those workstations that have only responded with the second acknowledgement sequence. This determination is made by using information concerning the identities of the workstations transmitting the first acknowledgement sequence and the second acknowledgement sequence stored in steps 62 and 74. This information is preferably transmitted with the acknowledgement sequences in, for instance, a source address field. The user is then preferably notified of the break and its location in step 86.

For example, referring to FIG. 3 and the break C described above, workstations 18A-18C will only respond with the first acknowledgement sequence and workstations 18D and 18E will only respond with the second acknowledgement sequence. Thus, the method and system formed in accordance with the present invention determine the break to be located between workstations 18C and 18D.

Figure 5D:
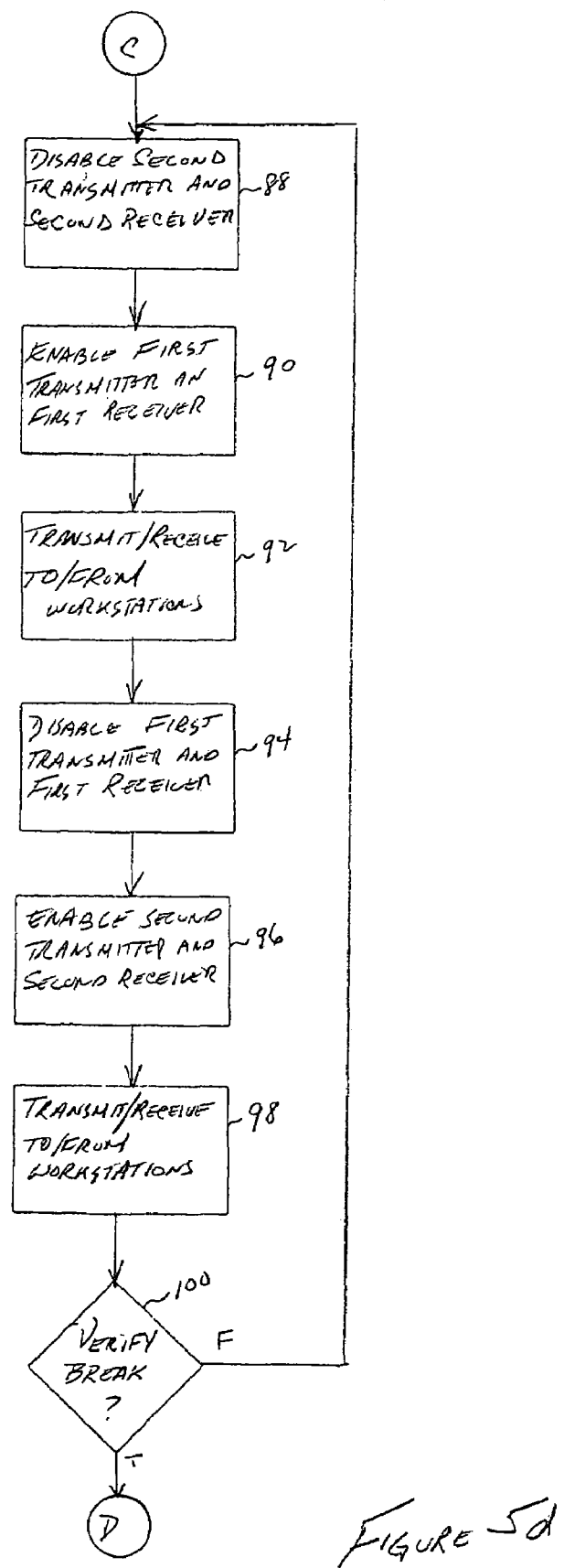

FIG. 5d shows a portion of the method in accordance with the present invention, which provides for uninterrupted access to all workstations despite a break in computer network connections. The second transmitter and second receiver are preferably disabled in step 88 and the first transmitter and first receiver are preferably enabled in step 90. One or more accesses are then preferably made to and/or from the workstations in step 92.

The first transmitter and first receiver are preferably disabled in step 94 and the second transmitter and second receiver are preferably enabled in step 96. One or more accesses, mirroring those made in step 92, are then preferably made to and/or from the workstations in step 98. If the break is to be verified in step 100, the method returns to step 52. If the break will not be verified in step 100, the method returns to step 88 to continue providing uninterrupted access to all workstations as long as there is only one break in the computer network connections. Although determining the location of the break, as shown in FIGS. 5a-5c, and providing uninterrupted access to all workstations, as shown in FIG. 5d, are shown as portions of one process, these tasks, as well as any subset of these tasks, may also be implemented independently of one another while remaining within the scope of the present invention.

Accordingly, the method and system formed in accordance with the present invention is able to quickly and accurately detect and locate a break in network connections, while not distorting information on the network that may lead to communication errors. The present invention also provides uninterrupted access to all workstations even when there is a break in the network.

Although illustrative embodiments of the present invention have been described herein with reference to the accompanying drawings, it is to be understood that the invention is not limited to those precise embodiments, and that various other changes and modifications may be provided therein by one skilled in the art without departing from the scope or spirit of the invention.

What is claimed is:

1. A computer network system, the computer network system comprising:
a server;
a first transmitter;
a first receiver;
a second transmitter;
a second receiver, the first transmitter, first receiver, second transmitter, and second receiver being operatively connected to the server; and
a plurality of workstations, the plurality of workstations being serially connected in a daisy-chain configuration by a transmit path, the first transmitter being operatively connected to the transmit path, the second transmitter being operatively connected to the transmit path, the plurality of workstations being serially connected in a daisy-chain configuration by a receive path, the first receiver being operatively connected to the receive path, the second receiver being operatively connected to the receive path, the transmit path including a first end and a second end, the first transmitter being connected between the first end of the transmit path and the server, the second transmitter being connected between the second end of the transmit path and the server, the receive path including a first end and a second end, the first receiver being connected between the first end of the receive path and the server, the second receiver being connected between the second end of the receive path and the server, the receive path being separate from the transmit path, the first transmitter and the first receiver being enabled during a normal mode, the second transmitter and the second receiver being disabled during the normal mode, the first transmitter and the first receiver being used to access at least one of the plurality of workstations during the normal mode, the first transmitter and the first receiver being enabled during a first phase of a breakage diagnostic mode, the second transmitter and the second receiver being disabled during the first phase of the breakage diagnostic mode, the first transmitter transmitting a first test sequence, at least one of the plurality of workstations being adapted for transmitting a first acknowledgement sequence in response to receiving the first test sequence, the first receiver receiving a quantity of first acknowledgement sequences, the first transmitter and the first receiver being disabled during a second phase of the breakage diagnostic mode, the second transmitter and the second receiver being enabled during the second phase of the breakage diagnostic mode, the second transmitter transmitting a second test sequence, at least one of the plurality of workstations being adapted for transmitting a second acknowledgement sequence in response to receiving the second test sequence, the second receiver receiving a quantity of second acknowledgement sequences, the quantity of first acknowledgement sequences being compared with the quantity of second acknowledgement sequences to determine whether a discontinuity in the computer network has occurred.

2. A computer network system as defined by claim 1, wherein at least one of the plurality of workstations includes a transmit input, a transmit output, a receive input, and a receive output, the transmit input and the transmit output being operatively connected to the transmit path, the receive input and the receive output being operatively connected to the receive path, a transmit signal being conducted on the transmit path, the transmit signal being inputted to the transmit input and outputted to the transmit output, a receive signal being conducted on the receive path, the receive signal being inputted to the receive input and outputted to the receive output.

3. A computer network system as defined by claim 1, wherein the server includes a personal computer.

4. A computer network system as defined by claim 1, wherein the discontinuity is determined to have occurred in response to the quantity of first acknowledgement sequences and the quantity of second acknowledgement sequences being unequal.

5. A computer network system as defined by claim 1, wherein the location of the discontinuity is determined as being between those of the plurality of workstations transmitting the first acknowledgement sequence and those of the plurality of workstations transmitting the second acknowledgement sequence.

6. A computer network system as defined by claim 1, wherein at least one of the first transmitter, first receiver, second transmitter, and second receiver are terminated with a characteristic line impedance Z when disabled.

7. A computer network system as defined by claim 1, wherein the first transmitter and the first receiver are enabled during a third phase of the breakage diagnostic mode, the second transmitter and the second receiver being disabled during the third phase of the breakage diagnostic mode, the first transmitter transmitting transmit information to at least one of the plurality of workstations on a first side of a discontinuity in the computer network, the first receiver receiving first receive information from at least one of the plurality of workstations on the first side of the discontinuity, the first transmitter and the first receiver being disabled during a fourth phase of the breakage diagnostic mode, the second transmitter and the second receiver being enabled during the fourth phase of the breakage diagnostic mode, the second transmitter transmitting the transmit information to at least one of the plurality of workstations on the second side of the discontinuity, the second receiver receiving second receive information from at least one of the plurality of workstations on the second side of the discontinuity, thereby enabling the plurality of workstations to be accessed on both sides of the discontinuity.

8. A method of detecting discontinuities in a computer network system, the method comprising the steps of:

connecting a first transmitter, a first receiver, a second transmitter, and a second receiver operatively to a server;

connecting a plurality of workstations serially in a daisy-chain configuration by a transmit path;

connecting the first transmitter and the second transmitter operatively to the transmit path;

connecting the plurality of workstations serially in a daisy-chain configuration by a receive path;

connecting the first receiver and the second receiver operatively to the receive path;

enabling the first transmitter and the first receiver during a first phase of a breakage diagnostic mode;

disabling the second transmitter and the second receiver during the first phase of the breakage diagnostic mode;

transmitting a first test sequence by the first transmitter;

transmitting a first acknowledgement sequence in response to at least one of the plurality of workstations receiving the first test sequence;

receiving a quantity of first acknowledgement sequences by the first receiver;

disabling the first transmitter and the first receiver during a second phase of the breakage diagnostic mode;

enabling the second transmitter and the second receiver during the second phase of the breakage diagnostic mode;

transmitting a second test sequence by the second transmitter;

transmitting second acknowledgement sequence in response to at least one of the plurality of workstations receiving the second test sequence;

receiving a quantity of second acknowledgement sequences by the second receiver;

comparing the quantity of first acknowledgement sequences with the quantity of second acknowledgement sequences;

detecting a discontinuity in the computer network in response to an outcome of the comparison of the quantity of first acknowledgement sequences with the quantity of second acknowledgement sequences, the transmit path including a first end and a second end, the receive path including a first end and second end;

connecting the first transmitter between the first end of the transmit path and the server;

connecting the second transmitter between the second end of the transmit path and the server;

connecting the first receiver between the first end of the receive path and the server;

connecting the second receiver between the second end of the receive path and the server, the receive path being separate from the transmit path;

enabling the first transmitter and the first receiver during a normal mode;

disabling the second transmitter and the second receiver during the normal mode; and accessing at least one of the plurality of workstations with the first transmitter and the first receiver during the normal mode.

9. A method of detecting discontinuities in a computer network system as defined by claim 8, further comprising the step of detecting that the discontinuity in the computer network has occurred in response to the quantity of the first acknowledgement sequences and the quantity of the second acknowledgement sequences being unequal.

10. A method of detecting discontinuities in a computer network system as defined by claim 8, further comprising the step of determining the location of the discontinuity in the computer network as being between those of the plurality of workstations transmitting the first acknowledgement sequence and those of the plurality of workstations transmitting the second acknowledgement sequence.

11. A method of detecting discontinuities in a computer network system as defined by claim 8, further comprising the step of terminating at least one of the first transmitter, first receiver, second transmitter, and second receiver with a characteristic line impedance Z when disabled.

12. A method of detecting discontinuities in a computer network system as defined by claim 8, further comprising the steps of:

enabling the first transmitter and the first receiver during a third phase of the breakage diagnostic mode;

disabling the second transmitter and the second receiver during a third phase of the breakage diagnostic mode;

transmitting transmit information by the first transmitter to at least one of the plurality of workstations on a first side of a discontinuity in the computer network;

receiving first receive information by the first receiver from at least one of the plurality of workstations on the first side of the discontinuity;

disabling the first transmitter and the first receiver during a fourth phase of the breakage diagnostic mode;

enabling the second transmitter and the second receiver during the fourth phase of the breakage diagnostic mode;

transmitting the transmit information by the second transmitter to at least one of the plurality of workstations on the second side of the discontinuity receiving second receive information by the second receiver from at least one of the plurality of workstations on the second side of the discontinuity, thereby enabling the plurality of workstations to be accessed on both sides of the discontinuity.

13. A computer network control unit, the computer network control unit comprising:

a first transmitter;

a first receiver;

a second transmitter; and a second receiver, the first transmitter, first receiver, second transmitter, and second receiver adapted for being operatively connected to a server and a plurality of workstations serially connected in a daisy-chain configuration by a transmit path and a receive path, the first transmitter being operatively connected to the transmit path, the second transmitter being operatively connected to the transmit path, the first receiver being operatively connected to the receive path, the second receiver being operatively connected to the receive path, the transmit path including a first end and a second end, the first transmitter being connected between the first end of the transmit path and the server, the second transmitter being connected between the second end of the transmit path and the server, the receive path including a first end and a second end, the first receiver being connected between the first end of the receive path and the server, the second receiver being operatively connected between the second end of the receive path and the server, the receive path being separate from the transmit path, the first transmitter and the first receiver being enabled during a normal mode, the second transmitter and the second receiver being disabled during the normal mode, the first transmitter and the first receiver being used to access at least one of the plurality of workstations during the normal mode, the first transmitter and the first receiver being enabled during a first phase of a breakage diagnostic mode, the second transmitter and the second receiver being disabled during the first phase of the breakage diagnostic mode, the first transmitter transmitting a first test sequence, the first receiver receiving a quantity of first acknowledgement sequences transmitted by at least one of the plurality of workstations in response to receiving the first test sequence, the first transmitter and the first receiver being disabled during a second phase of the breakage diagnostic mode, the second transmitter and the second receiver being enabled during the second phase of the breakage diagnostic mode, the second transmitter transmitting a second test sequence, the second receiver receiving a quantity of second acknowledgement sequences transmitted by at least one of the plurality of workstations in response to receiving the second test sequence, the quantity of first acknowledgement sequences being compared with the quantity of second acknowledgement sequences to determine whether a discontinuity in a computer network has occurred.

14. A computer network control unit as defined by claim 13, wherein the discontinuity is determined to have occurred in response to the quantity of first acknowledgement sequences and the quantity of second acknowledgement sequences being unequal.

15. A computer network control unit as defined by claim 13, wherein the location of the discontinuity is determined as being between those of the plurality of workstations transmitting the first acknowledgement sequence and those of the plurality of workstations transmitting the second acknowledgement sequence.

16. A computer network control unit as defined by claim 13, wherein at least one of the first transmitter, first receiver, second transmitter, and second receiver are terminated with a characteristic line impedance Z when disabled.

17. A computer network control unit as defined by claim 13, wherein the first transmitter and the first receiver are enabled during a third phase of the breakage diagnostic mode, the second transmitter and the second receiver being disabled during the third phase of the breakage diagnostic mode, the first transmitter adapted for transmitting transmit information to at least one of the plurality of workstations on a first side of a discontinuity in the computer network, the first receiver adapted for receiving first receive information from at least one of the plurality of workstations on the first side of the discontinuity, the first transmitter and the first receiver being disabled during a fourth phase of the breakage diagnostic mode, the second transmitter and the second receiver being enabled during the fourth phase of the breakage diagnostic mode, the second transmitter adapted for transmitting the transmit information to at least one of the plurality of workstations on the second side of the discontinuity, the second receiver adapted for receiving second receive information from at least one of the plurality of workstations on the second side of the discontinuity, thereby enabling the computer network control unit to access the plurality of workstations on both sides of the discontinuity.

\* \* \* \* \*